United States Patent [19]

Owen et al.

[11] 3,842,216

[45] Oct. 15, 1974

[54] FREQUENCY-SELECTIVE RINGING CURRENT SENSOR FOR TELEPHONE LINE

[75] Inventors: James Owen, Milwaukie; El Don L. Hoven, Lake Oswego, both of Oreg.

[73] Assignee: Ford Industries, Inc., Portland, Oreg.

[22] Filed: Aug. 7, 1972

[21] Appl. No.: 278,217

[52] U.S. Cl. .............................. 179/84 L, 179/84 R

[51] Int. Cl. ........................................... H04m 1/26

[58] Field of Search ........ 179/84 R, 84 A, 84 L, 86; 235/156; 250/217 S, 211 J, 206, 552

[56] References Cited

UNITED STATES PATENTS

| | | | |
|---|---|---|---|
| 3,413,480 | 11/1968 | Biard | 250/217 S |
| 3,469,036 | 9/1969 | Meri | 179/84 R |
| 3,521,041 | 7/1970 | Van Blerkom | 235/156 |
| 3,578,919 | 5/1971 | O'Neill | 179/84 VF |
| 3,629,509 | 12/1971 | Glaser | 179/15 A |
| 3,751,667 | 8/1973 | Quittner | 250/211 J |

FOREIGN PATENTS OR APPLICATIONS

| | | | |
|---|---|---|---|
| 1,050,045 | 12/1966 | Great Britain | 179/84 L |

*Primary Examiner*—Kathleen H. Claffy
*Assistant Examiner*—Alan Faber
*Attorney, Agent, or Firm*—Kolisch, Hartwell, Dickinson & Stuart

[57] ABSTRACT

Apparatus for sensing the presence of AC ringing current in a telephone line. The apparatus includes a neon lamp which flashes at the same rate as the frequency of current in such a line—this lamp being optically coupled to a phototransistor in a circuit which feeds pulses, at the same frequency, into a digital frequency filter. The filter produces an output signal for the apparatus only under circumstances with the frequency of such pulses, and hence of the current in the line, being characteristic of known ringing current frequencies.

6 Claims, 2 Drawing Figures

FREQUENCY-SELECTIVE RINGING CURRENT SENSOR FOR TELEPHONE LINE

BACKGROUND AND SUMMARY OF THE INVENTION

This invention pertains to apparatus for selectively sensing the presence of AC ringing current in a telephone line. More specifically, it pertains to such apparatus which employs a digital frequency filter in an arrangement where information is coupled to the filter through the transmission of light pulses between a light source which is connected to a line, and a light-responsive circuit which is connected to the filter.

In various types of automated equipment adapted for coupling to a telephone line, such as a telephone answering device or a call diverter, it is important that the equipment be capable of responding reliably to the presence of ringing current in the line—such current indicating the arrival of an incoming telephone call. Ringing current is an AC current, and in most instances has a frequency lying within the range of about 16 to 67 Hertz.

One of the problems in the past has been that available apparatus for sensing the presense of ringing current has not been sufficiently selective. As a consequence, other relatively low-frequency currents which flow in a telephone line are sometimes detected and responded to as if they were in fact ringing currents. For example, so-called "dial tap" current, which is an AC current normally at a frequency of about 10 Hertz, is often mistaken for ringing current.

Prevalent among the types of available ringing current sensing equipment are circuits which directly couple to a telephone line, and employ, for frequency filtering purposes, either an inductance-capacitance type filter, a resistance-capacitance type filter, or a tuned transformer. Unfortunately, at the relatively low frequencies (mentioned above) which are typically used for ringing currents, these types of arrangements are difficult to make simply and economically with sufficient selectivity to prevent a false response to a closely-frequency-related nonringing current in a line.

A general object of the present invention, therefore, is to provide novel apparatus for sensing the presence of AC ringing current in a line, which apparatus is characterized by simplicity, economy, and a high degree of selectivity, and which therefore overcomes many of the deficiencies of prior art apparatus.

More particularly, an object of the invention is to provide such apparatus which employs a digital frequency filter that will respond only to a signal frequency characteristic of known ringing currents.

A further object of the invention is to provide apparatus of the type so far generally indicated which further includes novel means for coupling information from a telephone line into a filter of the type above indicated. Such means herein comprises a light source which is adapted to be connected to a telephone line to be energized by current flowing therein, and which is optically coupled to a light-responsive circuit that in turn is connected to the digital filter.

While in many applications entirely satisfactory performance is obtainable by employing a digital filter which discriminates between signal frequencies falling simply above and below a selected frequency, there are many other applications where it is desirable to select a band of acceptable frequencies. Such a band, of course, is chosen to encompass, closely, the known range of frequencies typifying ringing currents. A preferred embodiment of the invention is described herein in conjunction with a filter capable of accepting such a band.

Thus, a more specific object of the invention is to provide apparatus of the type above mentioned wherein the digital frequency filter responds to any signal frequency falling within a selected range of frequencies.

According to a preferred embodiment of the invention, the proposed apparatus includes an input circuit containing a neon lamp and adapted to be directly connected to a telephone line in such a manner that AC current flowing in the line causes intermittent firing or energizing of the lamp at a rate which is the same as the frequency of such current. Optically coupled to this lamp is a phototransistor in a light-responsive circuit which, with flashing of the lamp, supplies pulses to the input terminal of a digital frequency filter. The filter is adapted to produce a responsive output signal for the apparatus only in the event that such pulses occur at a frequency which lies within the range of frequencies normally characterizing ringing current.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

Figure 1:
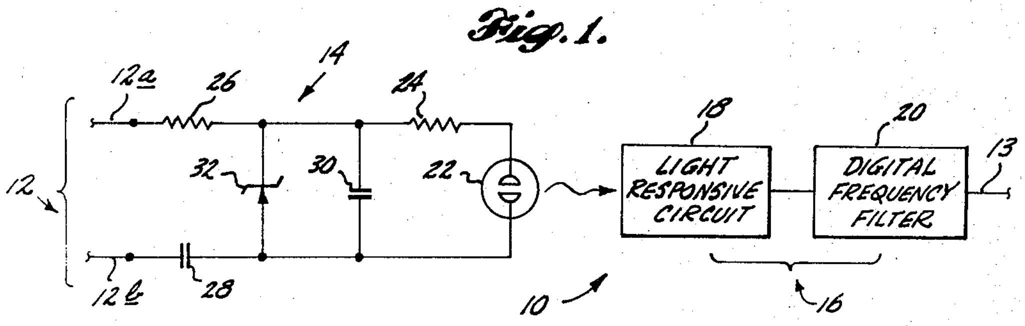
FIG. 1 is a simplified schematic/block diagram illustrating the apparatus of the present invention connected for use with a telephone line.

Explaining briefly certain terminology which will be used in the description which follows, various components shown in the drawings operate in response to a pair of voltage levels. More specifically, one of these levels corresponds to a certain positive voltage (typically about +3 volts) which will be referred to hereinafter as a 1 state. The other level corresponds to ground, and will be called hereinafter a 0 state. A terminal, or a conductor, having one of these voltage levels on it will be referred to as being in or having on it, either a 1 or a 0 state.

Turning now to the drawings, and referring first to FIG. 1, indicated generally at 10 is apparatus as contemplated herein for sensing the presence of AC ringing current in a telephone line, such as telephone line 12. In general terms, apparatus 10 includes an input circuit 14 which is connected directly to the conductors 12*a*, 12*b* in telephone line 12, and an output circuit 16 which includes a light-responsive, or radiation-responsive, circuit 18 and a digital frequency filter 20.

Telephone line 12 is a conventional telephone line wherein, during ringing (to indicate the presence of an incoming call), an AC current flows having a frequency in the range of about 16 to 67 Hertz. This ringing current might typically have an RMS value in the range of about 1 to 5 milliamperes, and might typically be supplied at an AC voltage (between conductors 12*a*, 12*b*) having an RMS value of between about 40 and 170 volts. It may be assumed, for the purpose of explanation herein, that apparatus 10 has been connected to the conductors in line 12 for the purpose of "informing" a conventional telephone answering device (not shown) when an incoming call is arriving on line 12. As will be more fully explained, such informing takes the form of a voltage change on an output conductor 13 which is connected to filter 20.

Still referring to FIG. 1, input circuit 14, which is also referred to herein as a light-emitting circuit, includes a neon lamp 22, one side of which is connected to conductor 12*a* through series resistors 24, 26, and the other side of which is connected to conductor 12*b* through a capacitor 28. Lamp 22 is also referred to herein as a light source, and also as a source of optical radiation. Further included in the circuitry interconnecting lamp 22 and conductors 12*a*, 12*b* is the parallel combination of a capacitor 30 and a Zener diode 32. This combination is connected between the junction of resistors 24, 26, and the junction of lamp 22 and capacitor 28.

Explaining briefly the operation of circuit 14, with AC ringing current flowing in line 12, each time that conductor 12*a* becomes positive relative to conductor 12*b*, lamp 22 fires or flashes. The rate of flashing in the lamp is the same as the frequency of the particular AC current then producing such flashing. Resistors 24, 26 limit the maximum amount of current which can flow through the lamp (and in the telephone line), and capacitor 28 serves the dual function of providing DC isolation to the line and of providing voltage build-up for assuring reliable firing of the lamp. Capacitor 30 suppresses transient currents, and diode 32 regulates the firing voltage applied to the lamp.

Figure 2:
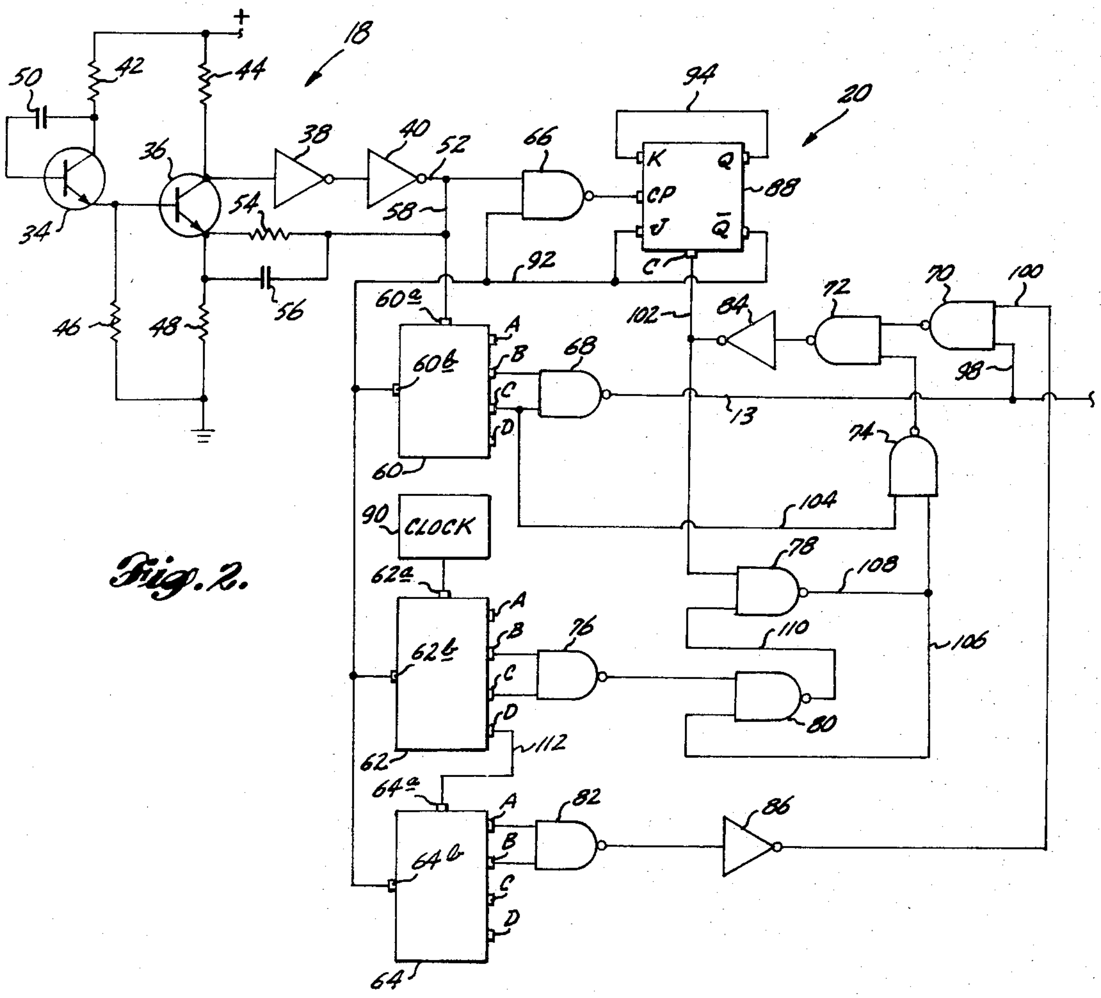
FIG. 2 is another schematic/block diagram illustrating details of a light-responsive circuit and of a digital frequency filter employed in the apparatus of FIG. 1.

Turning now to FIG. 2 which illustrates the details of circuit 18 and of filter 20, circuit 18 includes a pair of transistors 34, 36 and a pair of inverters 38, 40. Transistor 34 is a phototransistor whose base is optically coupled to lamp 22. More specifically, transistor 34 is positioned relative to lamp 22 whereby the base in the transistor is adequately exposed to light emitted from the lamp.

Positive bias voltage (from any suitable source of positive voltage) is provided the collectors in transistors 34, 36 through resistors 42, 44, respectively. The emitters of transistors 34, 36 are grounded through resistors 46, 48, respectively. The base of phototransistor 34 is coupled through a capacitor 50 to the collector of the phototransistor; and the base of transistor 36 is connected directly to the emitter of phototransistor 34. The collector of transistor 36 is connected through series-connected inverters 38, 40 to a conductor 52. The emitter of transistor 36 is connected through the parallel combination of a resistor 54 and a capacitor 56 to a conductor 58 which also is connected to conductor 52.

In the absence of any AC current in line 12, transistors 34, 36 are both nonconductive. As a consequence, the output terminals of inverters 38, 40 are normally in "0" and "1" states, respectively.

Digital filter 20 includes: three four-bit digital counters 60, 62, 64; nine two-input NAND gates 66, 68, 70, 72, 74, 76, 78, 80, 82; two inverters 84, 86 (which are substantially the same in construction as previously mentioned inverters 38, 40), and a J-K flip-flop 88. Also included in the filter is a 120 Hertz clock 90. All of these units are conventional readily available electronic devices.

Counters 60, 62, 64 include counting terminals 60*a*, 62*a*, 64*a*, and reset terminals 60*b*, 62*b*, 64*b*, respectively. In addition, each counter includes four output terminals indicated at A, B, C, D. The three counters are substantially identical in construction, and explaining briefly how each performs, with a "0" state existing on the reset terminal of the counter, each negative-going edge of a square wave voltage pulse applied to the counting terminal in the counter results in a change of voltage state on one or more of the output terminals in the counter. With a "1" state applied to the reset terminal, the counter automatically resets to, and remains in, a zero-count condition. Table I below indicates the respective voltage states which exist on the different output terminals in each of these counters for a given count registered in the counter.

TABLE I

| Counted Pulse | States of Output Terminals A | B | C | D |
|---|---|---|---|---|
| 0 (Zero-count condition) | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

Each of the nine NAND gates functions as follows: with a 0 state on any input terminal of the gate, the output terminal thereof is held in a 1 state; with both input terminals in a 1 state, the output terminal is placed in a 0 state.

Flip-flop 88 includes six terminals designated CP, C, J, K, Q, and $\overline{Q}$. The operation of this unit will be explained later.

Previously mentioned conductor 52 is connected to the upper input terminal of gate 66. The lower input terminal of this gate is connected to a conductor 92, which is also connected to both the J and $\overline{Q}$ terminals in flip-flop 88. Conductor 92, further, is connected to the reset terminals of the counters. The output terminal of gate 66 is connected to the CP terminal of the flip-flop. The K and Q terminals of the flip-flop are directly interconnected through a conductor 94.

Output terminals B, C of counter 60 are connected to the two input terminals of gate 68. The output terminal of this gate is connected through previously mentioned conductor 13, and a conductor 98, to the lower input terminal of gate 70. The upper input terminal of gate 70 is connected through a conductor 100 to the output terminal of inverter 86.

Further tracing the connections in filter 20, the output terminal of gate 70 is connected to the upper input terminal of gate 72—the lower input terminal of the latter being connected to the output terminal of gate 74. The output terminal of gate 72 connects with the input terminal of inverter 84, and the output terminal of this inverter connects with a conductor 102, which connects with the C terminal of flip-flop 88. The left input terminal of gate 74 is connected through a conductor 104 to the C output terminal of counter 60. The right input terminal of gate 74 is connected through a conductor 106 to the lower input terminal of gate 80, and also is connected through conductor 106 and a conductor 108 to the output terminal of gate 78. Previously mentioned conductor 102 connects with the upper input terminal of gate 78; and the lower input terminal of this gate is connected through a conductor 110 to the output terminal of gate 80.

Gate 76 has its input terminals connected to output terminals B, C of counter 62, and its output terminal connected to the upper input terminal of gate 80.

The counting terminal of counter 64 is connected through a conductor 112 to the D output terminal of counter 62. The A and B output terminals of counter 64 are connected to the two input terminals of gate 82. The output terminal of gate 82 connects with the input terminal of inverter 86.

Clock 90 is connected to the counting terminal of counter 62.

Explaining now how the apparatus described herein performs, let us consider first the internal operation of flip-flop 88 with such connected as shown. Each time that the state at the C input terminal of the flip-flop changes from 1 to 0, the flip-flop is placed in a "cleared" condition, whereupon the K and Q terminals are placed in 0 states, and J and $\overline{Q}$ terminals are placed in 1 states. With a 0 state remaining on the C input terminal, the flip-flop is held in a cleared condition. However, on a 1 state being applied to the C input, the flip-flop is enabled to respond to state changes at its CP input terminal.

More particularly, with a 1 state on terminal C, each time that the voltage state at the CP input terminal changes from 1 to 0, the J and $\overline{Q}$ terminals switch to that state just previously occupied by the K and Q terminals, and similarly, the K and Q terminals switch to the same state just previously occupied by the J and $\overline{Q}$ terminals.

As has already been mentioned, in the absence of any AC current flowing in line 12, transistors 34, 36 are nonconductive. In addition, the output terminals of inverters 38, 40 are in 0 and 1 respectively. In filter 20, the output terminals of gates 66, 72, 80 are in 0 states, and the output erminals of the other six gates are in 1 states. Further, the output terminals of inverters 84, 86 are in 1 and 0 states, respectively. Flip-flop 88 is in a cleared condition, with a 0 state existing on terminals K, Q, and a 1 state existing on terminals J, $\overline{Q}$. Consequently, conductor 92 is in a 1 state, and counters 60, 62, 64 are held in zero-count conditions. Clock 90 is normally running at the frequency mentioned earlier.

If, under these conditions, AC current flows in line 12, lamp 22 flashes at the frequency of such current. The light pulses thus produced by the lamp are responded to in phototransistor 34, with this phototransistor, as well as transistor 36, turning on and off at the frequency of the lamp flashes. As a consequence of this action, square-wave voltage pulses occur on conductors 52, 58, alternating the voltage state on these conductors between 1 and 0. Such voltage pulses are also referred to herein as electrical-intensity-varying signals. These pulses begin with the state of conductors 52, 58 changing from 1 to 0.

with respect to these state changes on conductors 52, 58, and as will shortly be explained, filter 20 operates to determine whether their frequency falls within a range of frequencies which has been selected to indicate the presence of ringing current in line 12. As indicated earlier, ringing current normally has a frequency in the range of about 16 to 67 Hertz. In order to provide some acceptable leeway herein (in the event of minor departures of ringing frequency from this range), and further in order to simplify the circuitry in filter 20, filter 20 is constructed to interpret, as proper ringing current, any current in the line which produces flashes in lamp 22 at a frequency between about 13.8 Hertz and 80 Hertz. With respect, then, to this selected range of frequencies, it should be noted that the period of a 13.8 Hertz signal is about 72.4 milliseconds, and the period of an 80 Hertz signal is 12.5 milliseconds.

Considering now in detail the operation of filter 20, during the first pulse on conductors 52, 58, nothing occurs in counter 60, but the output terminal of gate 66 switches from a 0 to a 1 and then back to 0. On this latter change occurring, terminals K, Q in the flip-flop change from a 0 to a 1 state, and terminals J, $\overline{Q}$ change from a 1 to a 0 state. This change on the J and $\overline{Q}$ terminals places conductor 92 in a 0 state, and as a consequence, places counters 60, 62, 64 in conditions to begin counting.

Let us assume, initially, that the AC current flowing in line 12 which has initiated the operation just described is of too high a frequency to be ringing current, i.e., is above 80

Hertz. In such a situtation, a count of FOUR will be registered in counter 60 at some time prior to 50 milliseconds after this counter begins operating. And, on the count of FOUR being so registered, output terminal C in the counter changes from a 0 to a 1 state, and places a 1 state through conductor 104 on the left input terminal of gate 74.

At the same time that this operation is occurring, counter 62 is counting pulses coming from clock 90. With the pulse rate of this clock being 120 Hertz, the period of pulses produced by the clock is about 8.3 milliseconds. It will thus be noted that a count of SIX will be registered in counter 62 about 50 milliseconds after the beginning of counting in this counter, with output terminals B, C in the counter then both being in 1 states.

However, inasmuch as, under the circumstance being described, it takes longer for counter 62 to register a count of SIX than it takes for counter 60 to register a count of FOUR, conductor 106, and hence the right input terminal of gate 74, is still in a 1 state at the time that the left input terminal of the gate is switched from a 0 to a 1 state. Consequently, on the latter occurring, the output terminal of the gate switches to a 0 state, causing the output terminals of gate 72 and of inverter 84 to switch to 1 and 0 states, respectively. And, with switching of the output terminal of inverter 84 to a 0 state, flip-flop 88 is cleared, with terminals K, Q then returning to a 0 state, and terminals J, $\overline{Q}$ returning to a 1 state. The result of this action is that the counters are reset to zero-count conditions, and no longer respond to pulses at their counting terminals. No responsive output signal is produced on conductor 13 which would indicate that ringing current had flowed in the telephone line. Put another way, the apparatus determines that the current that did flow was not ringing current.

Assuming now that the AC current (mentioned earlier) flowing in line 12 has a frequency within the selected range of frequencies, then, a count of SIX is registered in counter 62 before a count of FOUR is registered in counter 60. As a consequence, before any state change occurs on conductor 104, conductor 106 is placed in a 0 state, which locks the output terminal of gate 74 in a 1 state regardless of what state change may then occur on conductor 104. Further, with conductor 106 placed in a 0 state, the output terminal of gate 80 becomes locked in a 1 state, and the output terminal of gate 78 becomes locked in a 0 state. Thus, conductor 106 itself becomes locked in a 0 state.

Such action in the filter indicates that the current in line 12 has a frequency below the highest frequency in the selected range. The next test which the filter performs is to determine whether the current in the line has a frequency above the lowest frequency in the selected range.

As stated earlier, we are now assuming that the current in the line is in fact ringing current, and thus has a sufficiently high frequency to fall within the selected range. As a result, a count of SIX is registered in counter 60 at a time prior to a count of THREE being registered in counter 64. Further explaining, with the frequency of the current flowing in the telephone line above 13.8 Hertz, a count of SIX is registered in counter 60 at a time earlier than about 389 milliseconds after the beginning of counting in the counter. On such a count being registered, output terminals B, C are both simultaneously in 1 states, whereupon the output terminal of gate 68 is placed in a 0 state. This change in state at the output terminal of gate 68 occurs also on conductors 13, 98. The change on conductor 98, though applied to the lower input terminal of gate 70, in ineffective at this time to cause any change in the state on the output terminal of gate 70. The state change on conductor 13, however, is effective as a responsive output signal from apparatus 10 to indicate the presence of true ringing current in line 12.

At a time after the state change just mentioned on conductor 13, and specifically at about 389 milliseconds, a count of THREE is registered in counter 64, with output terminals A, B in this counter then simultaneously being in 1 states. On such occurring, the output terminals of gate 82 and of inverter 86 change to 0 and 1 states, respectively. A 1 state voltage is thus applied to the upper input terminal of gate 70, Still, no change occurs at the output terminal of gate 70 until a 1 state is returned to the lower input terminal of this gate, which occurs upon a count of EIGHT being registered in counter 60. On this occurring, state changes occur at the output terminals of gates 70, 72, and of inverter 84, which return flip-flop 88 to a cleared condition, and counters 60, 62, 64 to zero-count conditions. And, as was mentioned earlier, with return of the counters to zero-count conditions, the voltage states initially present at various points in filter 20 return.

In the case of the frequency of AC current in line 12 being below 13.8 Hertz, then, a count of THREE is registered in counter 64 before a count of SIX is registered in counter 60. On such a count being first registered in counter 64, the upper input terminal of gate 70 is placed in a 1 state, which then results in clearing of flip-flop 88, and return of the counters to zero-count conditions. All of this occurs prior to the time when any state change can occur on conductor 13. Thus, the filter under such circumstances determines that a too-low frequency exists in current in line 12 for such current to be true ringing current.

If it is desired to adapt filter 20 simply to discriminate between line signal frequencies above and below a certain frequency—say above and below 13.8 Hertz—this is readily accomplished. More specifically, the following changes would be made in the filter: gates 72, 74, 76, 78, 80, inverter 84, and conductors 104, 106, 108, 110 would be removed; and the output terminal of gate 70 would be connected directly to conductor 102. Such changes are described verbally herein, rather than pictorially, in order to minimize the number of drawing figures employed.

With such changes made in the filter, a responsive output signal would appear on conductor 13 only in the event that the signal frequency in line 12 is no less than 13.8 Hertz.

Apparatus is thus provided which simply and reliably determines when ringing current flows in a telephone line. Input circuit 14 accurately indicates the frequency of any AC current flowing in such a line through the medium of lamp 22 which flashes at the same frequency as such current. With lamp 22 optically coupled to phototransistor 34, input circuit 14 is conveniently constructed to provide a desirable high-impedance, DC-isolated termination for a line. Digital filter 20, constructed as shown in FIG. 2, defines precise limits to the range of frequencies that will be accepted, and thus contributes a high degree of selectivity to the apparatus. With filter 20 modified as just indicated above, it defines a sharp discrimination point in the frequency spectrum. The complications which attend the use of tuned transformers, inductance-capacitance filters, and resistance-capacitance filters are avoided.

The particular frequency range, or frequency discrimination point, chosen to which the filter will respond may, of course, be selected to suit particular applications. The only change necessary in the filter to accomplish this is to select different appropriate output terminals in counters 60, 62, 64. If required, the pulse rate of clock 90 may be changed, and/or more counters (such as counters 62, 64) may be used, to attain the desired count comparisons (such as those described earlier) to determine the presence of the desired AC frequency, or frequencies.

While a preferred embodiment and a modification of the invention have been described, it is appreciated that other variations and modifications may be made without departing from its spirit.

It is claimed and desired to secure by Letters Patent:

1. Apparatus for sensing the presence of AC ringing current in a telephone line, where such current has a frequency no less than a certain frequency, said apparatus comprising an electric light source, a circuit for connecting said source to such a line to energize the former with AC current flowing in the latter whereby the intensity of light emitted by the source varies at the same frequency as that of such current, a light-responsive circuit optically coupled to said source, operable to produce an electrical-intensity-varying signal having the same frequency as that of light-intensity variations in the source, and a digital frequency filter operatively connected to said light-responsive circuit, operable to produce a responsive output signal for said apparatus only in the event that the frequency of a signal produced by said light-responsive circuit is no less than said certain frequency.

2. Apparatus for sensing the presence of AC ringing current in a telephone line, where such current has a frequency lying within a certain range of frequencies, said apparatus comprising an electric light source, a circuit for connecting said source to such a line to energize the former with AC current flowing in the latter whereby the intensity of light emitted by the source varies at the same frequency as that of such current, a light-responsive circuit optically coupled to said source, operable to produce an electrical-intensity-varying signal having the same frequency as that of light-intensity variations in the source, and a digital frequency filter operatively connected to said light-responsive circuit, operable to produce a responsive output signal for said apparatus only in the event that the frequency of a signal produced by said light-responsive circuit falls within said certain range of frequencies.

3. Apparatus for detecting the presence of AC ringing current in a telephone line and generating an output signal in response thereto, where such current has a frequency no less than a certain frequency, said apparatus comprising an input circuit adapted for connection to a telephone line and including means for emitting optical radiation when, with said circuit connected to such a line, AC current flows in the line, with the emitted radiation having an intensity which varies at the same frequency as that of said current, a radiation responsive circuit optically coupled to said input circuit for producing an intensity varying electrical signal upon exposure to radiation emitted by said means, with said signal being of the same frequency as the emitted radiation, and a frequency discriminating circuit comprising a digital frequency filter coupled to said radiation responsive circuit for determining if an intensity varying electrical signal produced by the radiation responsive circuit is no less than said certain frequency and for generating a responsive output signal if and only if said signal is no less than that certain frequency.

4. The apparatus of claim 3, wherein said means for emitting optical radiation comprises a neon lamp, and said radiation responsive circuit comprises a phototransistor.

5. Apparatus for detecting the presence of AC ringing current in a telephone line and generating an output signal in response thereto, where such current has a frequency lying within a given range of frequencies, said apparatus comprising an input circuit adapted for connection to a telephone line and including means for emitting optical radiation when, with said circuit connected to such a line, AC current flows in the line, with the emitted radiation having an intensity which varies at the same frequency as that of said current, a radiation responsive circuit optically coupled to said input circuit for producing an intensity varying electrical signal upon exposure to radiation emitted by said means, with said signal being of the same frequency as the emitted radiation, and a frequency discriminating circuit comprising a digital frequency filter coupled to said radiation responsive circuit for determining if an intensity varying electrical signal produced by the radiation responsive circuit is within said range of frequencies, and for generating a responsive output signal if and only if said signal is within said range.

6. The apparatus of claim 5, wherein said means for emitting optical radiation comprises a neon lamp, and said radiation responsive circuit comprises a phototransistor.

* * * * *